(12) United States Patent
LeCrone (10) Patent No.: US 10,983,696 B1
(45) Date of Patent: Apr. 20, 2021

(54) TAPE STORAGE RECLAMATION

(71) Applicant: EMC IP Holding Company LLC, Hopkinton, MA (US)

(72) Inventor: Douglas E. LeCrone, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/773,139

(22) Filed: Jan. 27, 2020

(51) Int. Cl.
*G06F 3/06* (2006.01)

(52) U.S. Cl.
CPC .......... *G06F 3/0608* (2013.01); *G06F 3/0652* (2013.01); *G06F 3/0686* (2013.01)

(58) Field of Classification Search
CPC .... G06F 3/0686; G06F 3/0608; G06F 3/0652; G06F 12/0891
USPC .......................................................... 711/111
See application file for complete search history.

(56) References Cited

U.S. PATENT DOCUMENTS

| 2003/0196036 A1* | 10/2003 | Gibble | G06F 3/0601 711/111 |
| 2009/0049310 A1* | 2/2009 | Carlson | G06F 3/0619 713/193 |
| 2014/0089269 A1* | 3/2014 | Akirav | G06F 16/188 707/689 |

* cited by examiner

*Primary Examiner* — Hashem Farrokh
(74) *Attorney, Agent, or Firm* — Muirhead and Saturnelli, LLC (57) ABSTRACT

Reclaiming storage space in a tape emulation unit includes determining portions of a tape image of the tape emulation unit that correspond to data/files that have expired, for each of the portions that have expired, overwriting each of the portions with a same value, and the tape emulation unit performing at least one of: compression or deduplication on each of the portions to reclaim storage space maintained by each of the portions. The same value may be zeros. Expiration information may be provided by header information on the tape image. The expiration information may be written by a host computer coupled to the tape emulation unit. The host computer may determine portions that have expired based on the header information. The host computer may run tape management software. The tape emulation unit may determine portions that have expired based on the header information.

16 Claims, 9 Drawing Sheets

TAPE STORAGE RECLAMATION

TECHNICAL FIELD

This application relates to the field of computer systems and storage systems therefor and, more particularly, to the field of reclaiming storage space for tape emulation units that use storage systems to store tape images.

BACKGROUND OF THE INVENTION

In conventional computer tape systems, a single tape may contain files/data for a plurality of different sources. For example, a single tape may contain data backed up from a number of different storage devices. Each of the different sources may be subject to a separate retention policy so that the retention time for one source is a first value and a retention time for a different source is a second, different, value. Thus, a single tape could include both expired files/data as well as unexpired files/data. In many tape systems, files/data can only be added to the end of the tape and existing files cannot be physically deleted. Therefore, as a tape ages, many files on the tape may expire. However, as long as there is one active file, the entire tape must be retained. It is possible to reclaim unused tape areas (i.e., areas containing expired files/data) by copying a tape having a small percentage of unexpired files and/or data to a new or existing tape with a higher percentage of files and/or data, thus freeing up the source tape to be reused.

However, in most modern tape systems today, the tapes are not physical tape, but are tape images stored on a storage system of a tape emulation unit. However, since an entire tape image may be stored as a single file, it is not possible (or at least practical) to delete and reuse space on the storage system corresponding to expired files/data unless all of the files/data of a tape image are expired. Just as with conventional computer tape systems, if an image on a storage system includes a single unexpired file or data portion, the entire image must be maintained and any space associated with expired files/data cannot be reclaimed.

Accordingly, it is desirable to be able to reclaim space corresponding to expired files/data on a system where tape images are stored on a storage system of a tape emulation unit.

SUMMARY OF THE INVENTION

According to the system described herein, reclaiming storage space in a tape emulation unit includes determining portions of a tape image of the tape emulation unit that correspond to data/files that have expired, for each of the portions that have expired, overwriting each of the portions with a same value, and the tape emulation unit performing at least one of: compression or deduplication on each of the portions to reclaim storage space maintained by each of the portions. The same value may be zeros. Expiration information may be provided by header information on the tape image. The expiration information may be written by a host computer coupled to the tape emulation unit. The host computer may determine portions that have expired based on the header information. The host computer may run tape management software. The tape emulation unit may determine portions that have expired based on the header information. The tape emulation unit may include a storage system that performs the compression or deduplication.

According further to the system described herein, a non-transitory computer readable medium contains software that reclaims storage space in a tape emulation unit. The software includes executable code that determines portions of a tape image of the tape emulation unit that correspond to data/files that have expired, executable code that overwrites each of the portions that have expired with a same value, and executable code that performs at least one of: compression or deduplication on each of the portions to reclaim storage space maintained by each of the portions. The same value may be zeros. Expiration information may be provided by header information on the tape image. The expiration information may be written by a host computer coupled to the tape emulation unit. The host computer may determine portions that have expired based on the header information. The host computer may run tape management software. The tape emulation unit may determine portions that have expired based on the header information. The tape emulation unit may include a storage system that performs the compression or deduplication.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism for reclaiming storage space in a tape emulation unit. Portions of a tape image corresponding to expired data/files are overwritten with data that causes the corresponding storage space to be automatically reclaimed by the tape emulation unit using data compression and/or deduplication.

Figure 1:
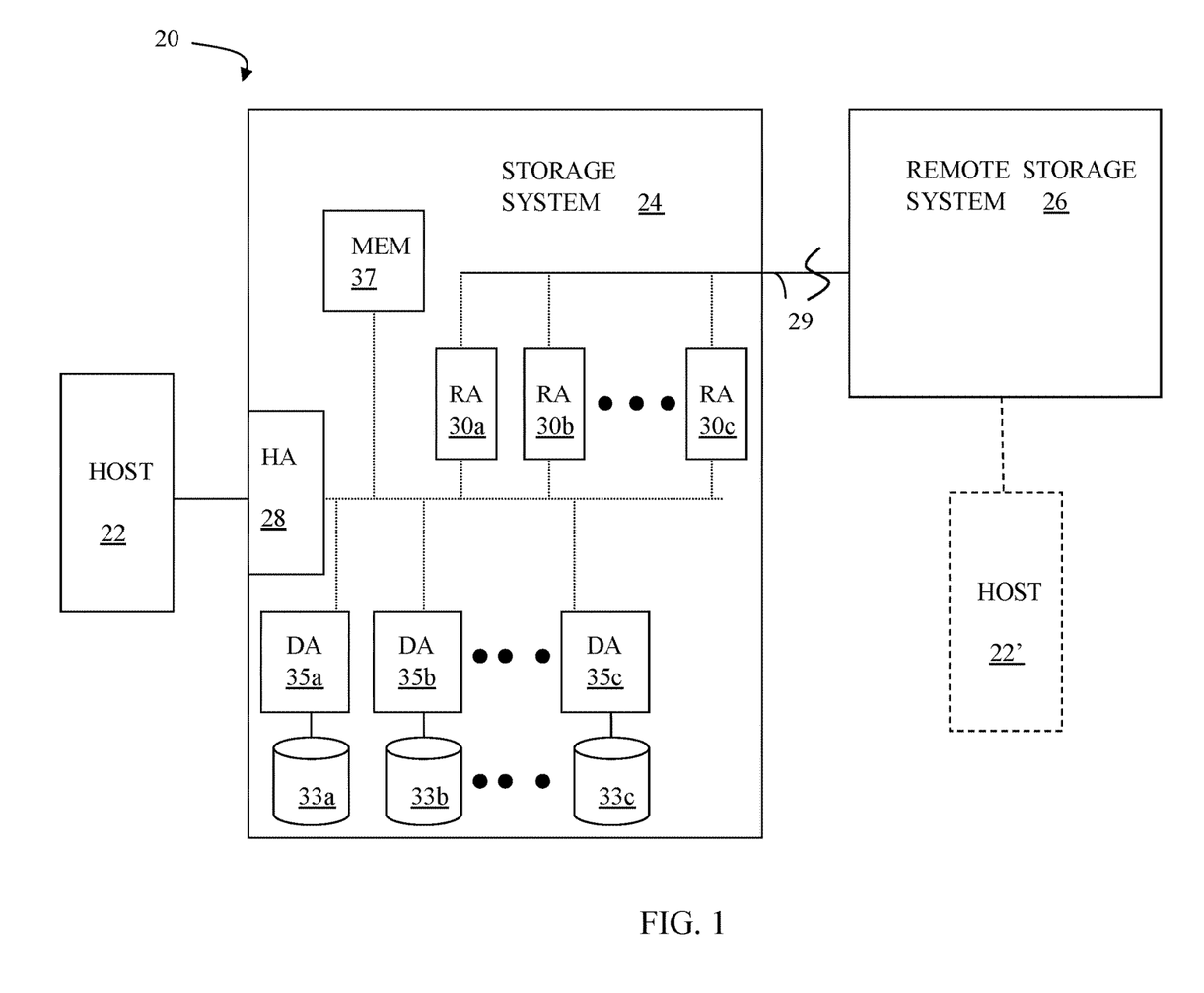
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
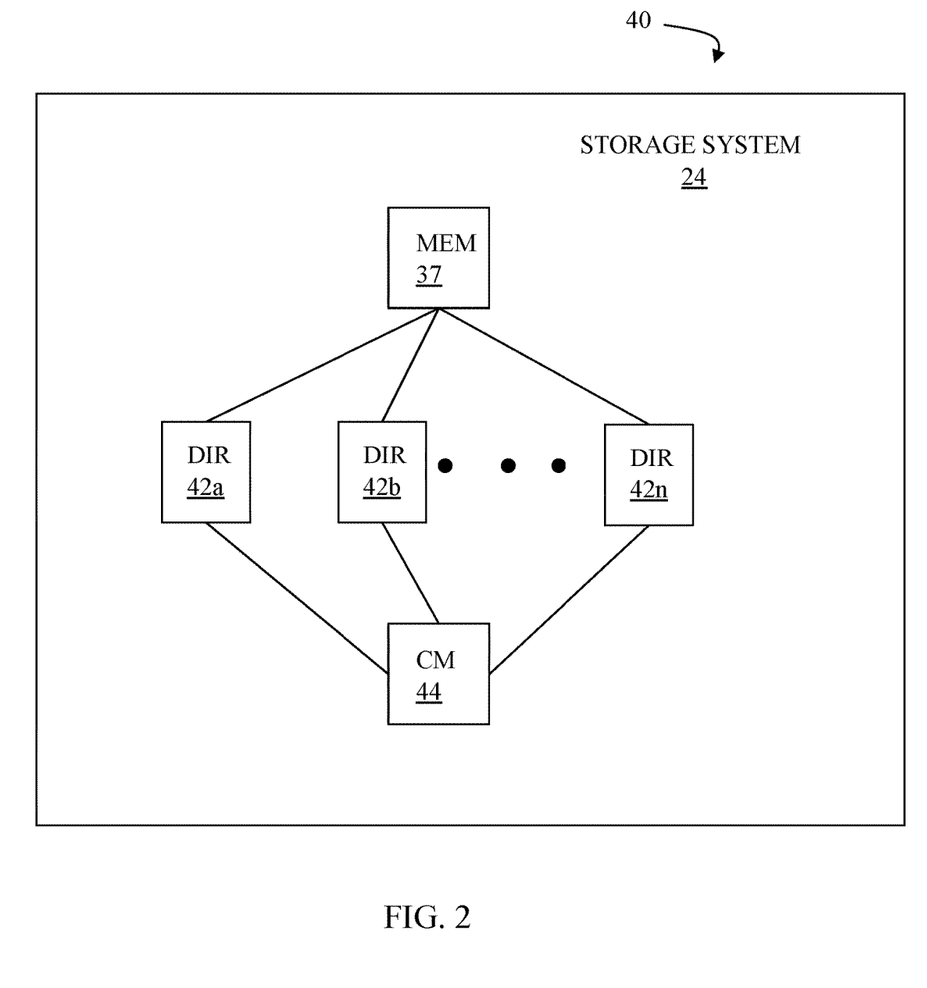
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIG. 1 and FIG. 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
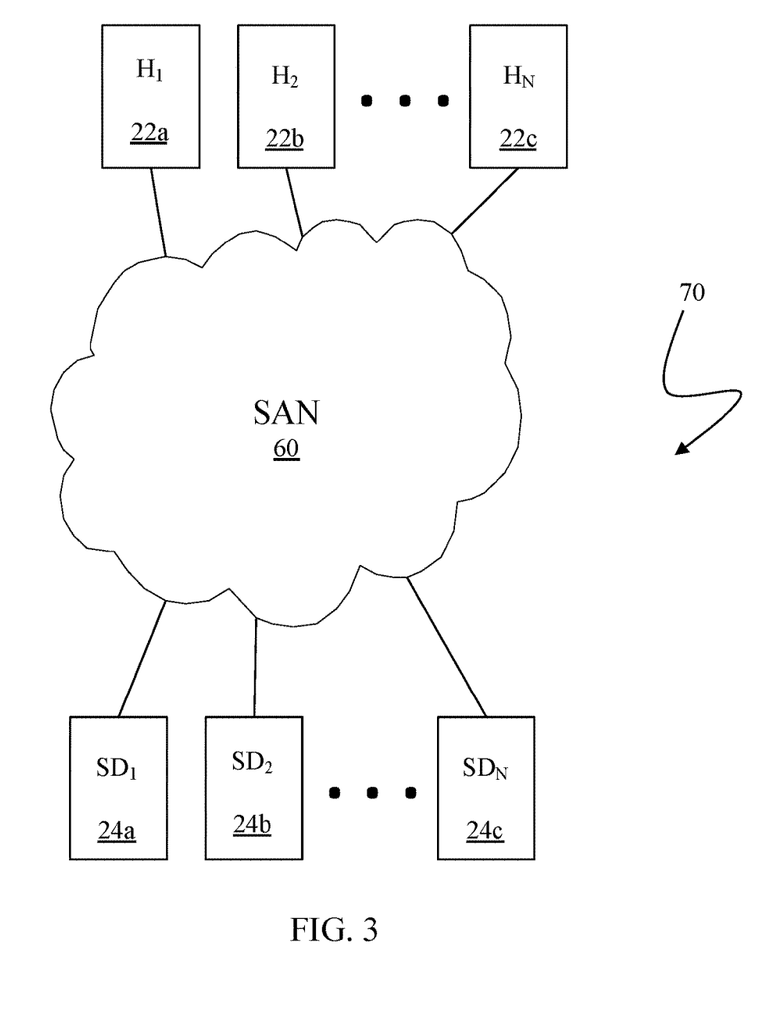
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
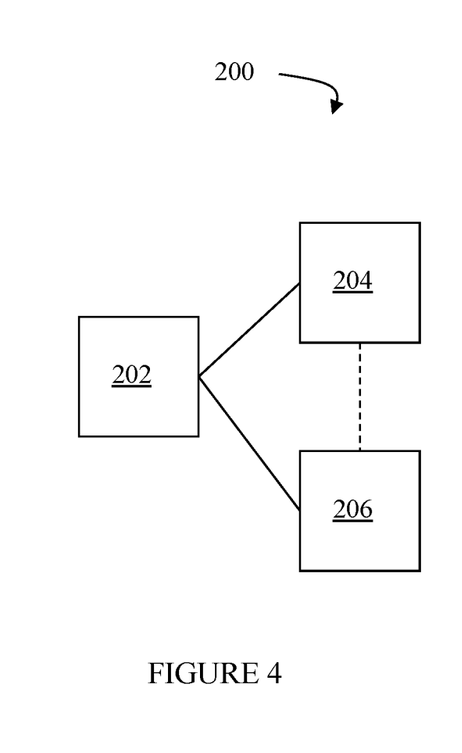
FIG. 4 is a schematic diagram illustrating system having a host, a storage device, and tape emulation unit according to an embodiment of the system described herein.

Referring to FIG. 4, a diagram 200 shows a host 202 coupled to a storage system 204 and coupled to a tape emulation unit 206. The host 202 may be any appropriate computing device, such as an IBM System z computing device, and may be similar to the hosts 22, 22' discussed elsewhere herein. The storage system 204, which may be similar to the storage systems 24, 26 described elsewhere herein, may be any storage system capable of providing the functionality described herein, such as a storage array provided by Dell EMC of Hopkinton, Mass. The tape emulation unit 206 provides tape emulation functionality to the host 202 so that applications on the host 202 that access tape data write tape data and commands to the tape emulation unit 206 and read tape data and status from the tape emulation unit 206 as if the tape emulation unit 206 were an actual computer tape device. The tape emulation unit 206 may be implemented using any appropriate device, such as the DLm8500 device provided by Dell EMC of Hopkinton, Mass. Tape emulation is described, for example, in U.S. Pat. No. 6,070,224 titled: "Virtual Tape System" to LeCrone, et al., which is incorporated by reference herein. In some instances, the storage system 204 may communicate directly with the tape emulation unit 206. Note that, although only a single host 202, a single storage system 204, and a single tape emulation unit 206 are shown, it is understood by one of ordinary skill in the art that the system may be extended to have more than one of each.

Figure 5:
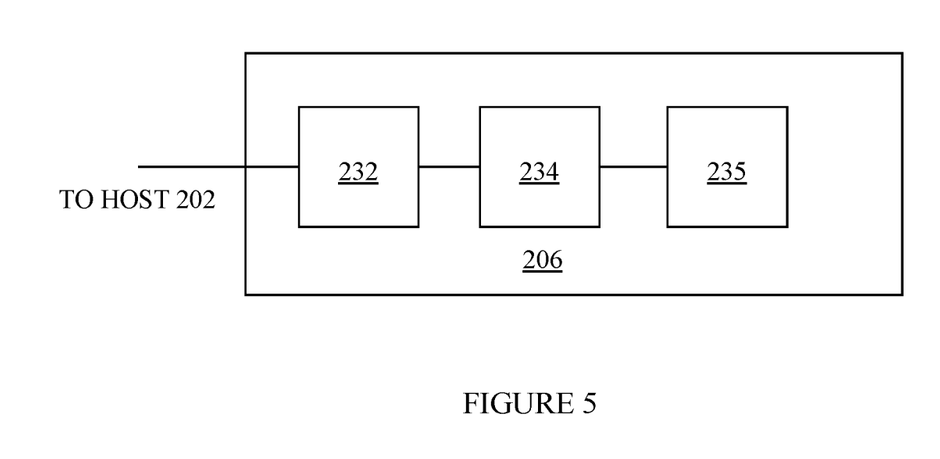
FIG. 5 is a schematic diagram illustrating a tape emulation unit according to an embodiment of the system described herein.

Referring to FIG. 5, the tape emulation unit 206 is shown in more detail as including a front end component 232, a data mover/server 234, and a tape emulation storage system 235 coupled thereto. The front end component 232 may include a FICON link that may be coupled to the host 202 for data communication between the host 202 and the tape emulation unit 206. Other types of links may be used. The front end component 232 may include FICON link emulation functionality as well as tape emulation functionality, such as the functionality provided by components of the DLm8500.

The data mover/server 234 may be coupled to the front end component 232 using, for example, a GigE switch while the storage system 235 is coupled to the data mover/server 234 using any appropriate protocol, such as Fibre Channel. The data mover/server 234 may be accessed by the front end component 232 using any appropriate protocol, such as NFS (Network File System). In an embodiment herein, the data mover/server 234 may include an NFS server, such as a Celera data mover, and the storage system 235 may be a Clarion or Symmetrix data storage array. There may be other components used instead of, and/or in addition to, the NFS server and the data storage system.

Figure 6:
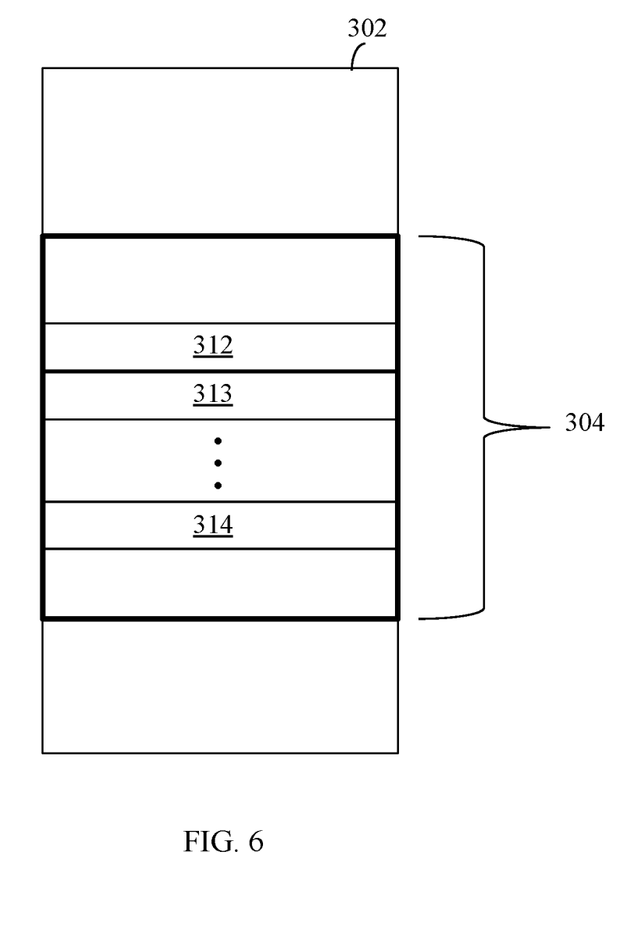
FIG. 6 is a diagram illustrating a memory of a host according to an embodiment of the system described herein.

Referring to FIG. 6, a memory space 302 of a host computer (e.g., the host 202) includes a common area 304 that may be accessed by different application running on the host computer. In an embodiment herein, more than one of the applications of the host computer may access that same portion(s) of the common area 304, although in some embodiments, there may be restrictions on multiple applications accessing the same memory space for writing at the same time and/or restrictions on simultaneous reading and writing.

In an embodiment herein, the host computer may be an IBM system running the MVS operating system or the z/OS operating system, although the system described herein may be implemented using any appropriate operating system. The common area 304 may include a plurality of UCBs (Unit Control Blocks) 312-314, which provide metadata for applications to access logical devices. In some cases (e.g., storage devices, tape devices), the UCBs provide information that is used in connection with accessing physical volume space corresponding to logical volume space of the UCB. An application accessing a tape device may access an appropriate one (or more) of the UCBs 312-314 corresponding to one or more logical devices, including tape emulation units.

Figure 7:
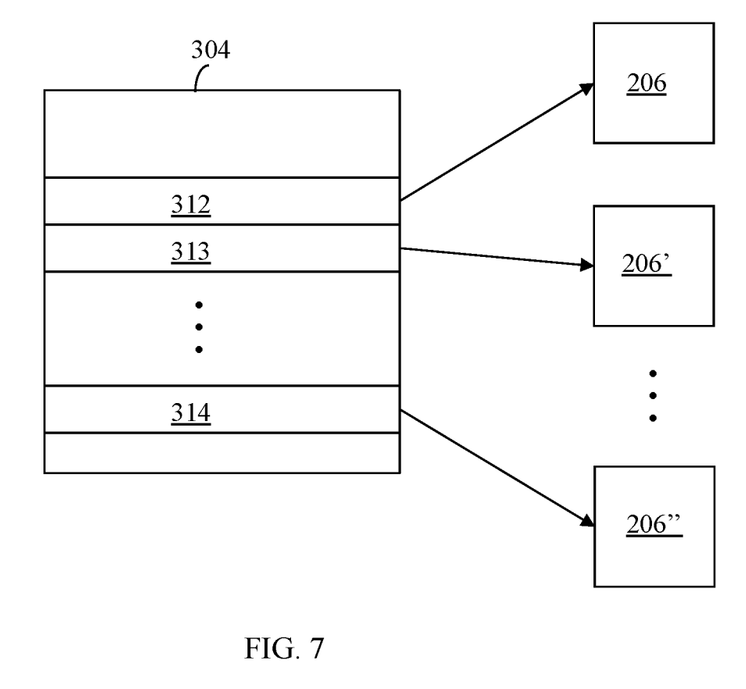
FIG. 7 is a schematic diagram illustrating UCB pointers for accessing a tape emulation unit according to an embodiment of the system described herein.

Referring to FIG. 7, the common area 304 is shown in more detail where the UCB 312 is shown referencing the tape emulation unit 206 so that an application on the host 202 can access (i.e., exchange data with) the tape emulation unit 206. Conventionally, applications in a host may write to a tape drive only one at a time so that, for example, if a first application is writing to a particular tape device while a second application requests access for writing, then the second application is queued and waits for access until the first application releases the tape device after the first write. However, the system described herein allows for multiple applications in a host to have concurrent access, including concurrent write access, to the tape emulation unit 206. This is illustrated by the UCB 313 referencing a first virtual tape emulation unit 206' and the UCB 314 referencing a second virtual tape emulation unit 206". As discussed in more detail elsewhere herein, the virtual tape emulation units 206', 206" correspond to the tape emulation unit 206 so that each of the UCBs 312-314 may concurrently write to the tape emulation unit 206.

Figure 8:
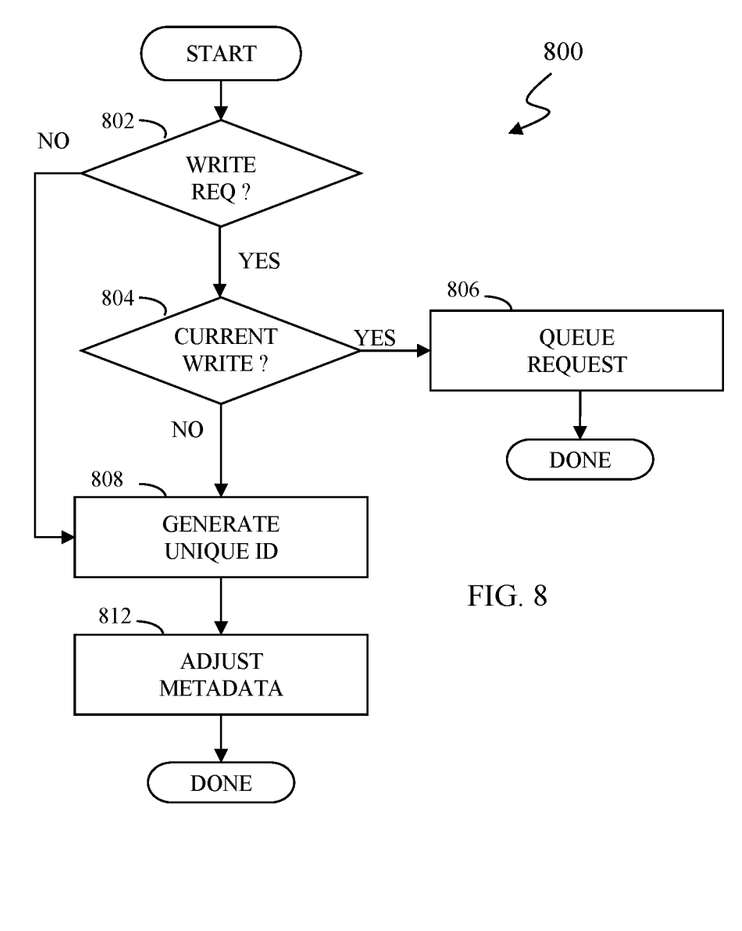
FIG. 8 is a flow diagram illustrating processing performed at a host in connection with accessing a tape emulation unit according to an embodiment of the system described herein.

Referring to FIG. 8, a flow diagram 800 illustrates processing performed in connection with an application running on the host 202 requesting attachment of the tape emulation unit 206. An application requests attachment in order to read or write tape data. For an actual tape drive, only one application at a time can access data on a tape. However, as described herein, using the tape emulation unit 206 allows multiple applications to read and write tape data concurrently. Note that this may occur without any modification(s) to any applications that access tape data so that, for example, a legacy application that was written to operate on an actual tape device may access tape data concurrently with other applications as described herein without any modifications to the legacy application.

Processing begins at a first test step 802 where it is determined if the attachment request is from an application that intends to write data to the tape emulation unit 206. If so, the control passes from the test step 802 to a test step 804 where it is determined if there is currently another application that is attached to the tape emulation unit 206 for writing data to the same section of tape (i.e., the same tape file). If so, then control transfers from the test step 804 to a step 806 where the attachment request is queued in a conventional manner to wait for release by the application that had previously attached to the tape emulation unit 206 to write data. In the system described herein, only one application at a time may write data to the same tape blocks/section of the tape emulation unit 206. However, as described elsewhere herein, it is possible to have more than one application concurrently write data to different blocks/sections the tape emulation unit 206. This is described in more detail elsewhere herein. Following the step 806, processing is complete.

If it is determined at the step 802 that the attached request is not for writing data or if it is determined at the step 804 that there are no applications currently attached for writing data to the same block (file) as the current request, then control transfers to the step 808 where a unique identifier is generated. In an embodiment herein, a unique identifier is generated for the tape emulation unit 206 to address legacy drivers and other system software of the host 202 that may reject concurrent attachment to the same tape device. The unique identifier handles this by simulating attachment to different tape devices. The unique identifier could include or could be the volume serial number. In other embodiments, it may be possible to rewrite legacy drivers and other system software to not reject concurrent attachments to the same tape device. Following the step 808 is a step 812 where the drivers and system software of the host attach the application to the tape emulation unit 206 using the unique identifier generated at the step 808. Following the step 812, processing is complete.

Figure 9:
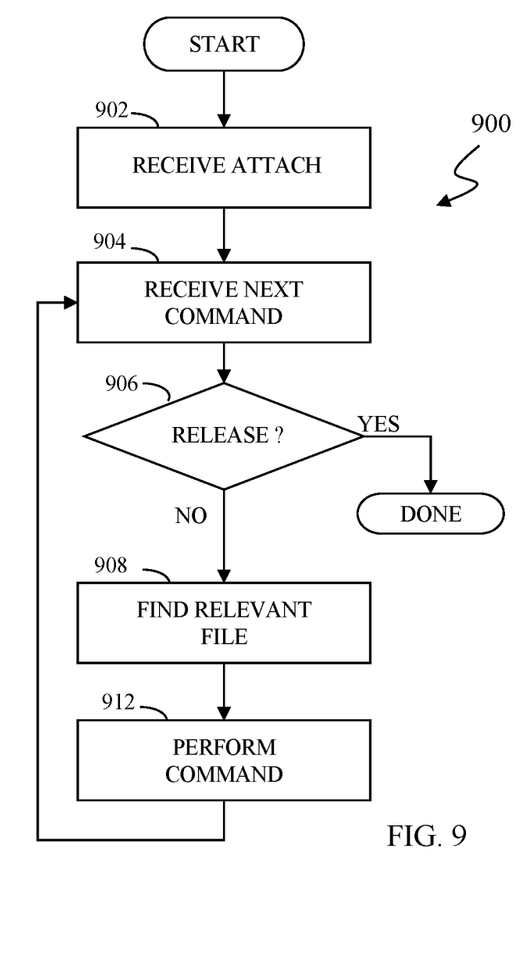
FIG. 9 is a flow diagram illustrating processing performed at a tape emulation unit in connection with receiving tape commands from a host according to an embodiment of the system described herein.

Referring to FIG. 9, a flow diagram 900 illustrates processing performed at a tape emulation unit 206 in connection with receiving tape commands from the host 202 (or from a similar device). Processing begins at a step 902 where an attach command is received where a process on the host attaches to the tape device. The system described herein allows multiple processes to concurrently attach to the same tape drive. The processing at the step 902 receives the attach command and keeps track of which particular process provided the attach command in order to be able to respond to commands from different processes that separately attach to the tape emulation unit 206. In an embodiment herein, at the step 902, the tape emulation unit 206 makes an entry in a table that facilitates distinguishing processes of the host 202 from each other when subsequent commands are received.

Following the step 902 is a step 904 where the tape emulation device 206 receives a next command (e.g., read tape data, write tape data, advance to a particular location on the tape, etc.). Following the step 904 is a test step 906 where it is determined if the command received at the step 904 was a command to release the tape drive, indicating that the process on the host 202 that attached to the tape emulation device 206 is not providing more commands to the tape drive in connection with the previous attachment. If the command that is received is a release command, then processing is complete. Otherwise, control transfers from the test step 906 to a step 908 where the tape emulation device 206 finds the file on the storage device 235 (discussed above) that corresponds to the data being accessed (which appears to the host 202 to be tape data). Following the step 908 is a step 912 where the command (e.g., read tape data, write tape data) is executed. Processing at the step 912 is described in more detail elsewhere herein. Following the step 912, control transfers back to the step 904, discussed above, where the next command is received.

Figure 10:
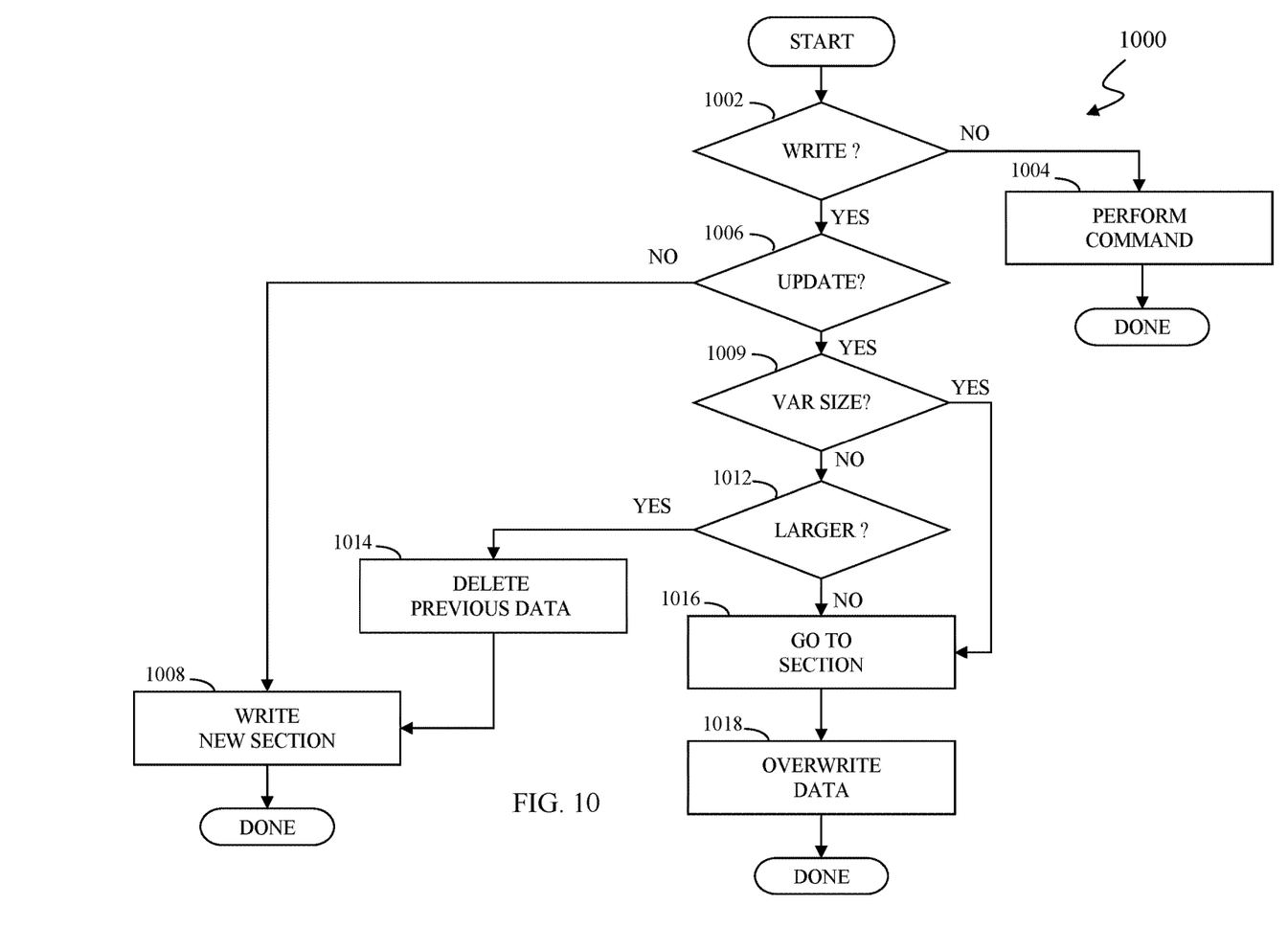
FIG. 10 is a flow diagram illustrating in more detail performing tape read and write commands according to an embodiment of the system described herein.

Referring to FIG. 10, a flow diagram 1000 illustrates in more detail the step 912, discussed above, where the tape command to read or write data is performed. Processing begins at a first test step 1002 where it is determined if the command is a write command. If not (e.g., the command is a read command), then control transfers to a step 1004 where the command is performed in a conventional manner. Following the step 1004, processing is complete. If it is determined at the test step 1002 that the command is a write command, then control transfers from the test step 1002 to a test step 1006 where it is determined if the write is an update to an existing section of tape (i.e., a series of tape blocks/file that was previously written). If not, then control transfers from the test step 1006 to a step 1008 where the new data is written to a new section of virtual tape (i.e., a file on the storage device 235, discussed above). Following the step 1008, processing is complete.

If it is determined at the test step 1006 that the data being written is an update of data that was previously written, then control transfers from the test step 1006 to a test step 1009 where it is determined if an underlying file system used for underlying files on the storage device 235 (discussed elsewhere herein) support variable size records/blocks, which would allow the new data to be larger than the data being replaced. If the underlying file system does not support variable size records/blocks, then control transfers to a test step 1012 where it is determined if the data being written is larger than the data that is being updated/replaced. For example, if the data being written is 500 kb is meant to update previous data that is 100 kb, then the new data is determined to be larger at the test step 1012. In such a case, control transfers from the test step 1012 to a step 1014 where a series of blocks/section corresponding to the previous data is deleted. Following the step 1014 is the step 1008, discussed above, where the new data is written to a new section of virtual tape. Following the step 1008, processing is complete.

If it is determined at the test step 1012 that the data being written is not larger than the data that is being updated/replaced, then control transfers from the test step 1012 to a step 1016 where the system seeks out the section (location) of the previous data, which could be a file on the storage device 235 (discussed elsewhere herein). Note that the step 1016 is also reached from the step 1009 if the underlying file systems supports variable size records/blocks, discussed above. Following the step 1016 is a step 1018 where the previous data is overwritten with the new data. Following the step 1018, processing is complete.

In some cases, it may be desirable to free up space corresponding to data that was previously stored on the tape emulation system but has expired. In some instances, data written to the tape emulation device 206 may have an expiration date due to a corresponding policy. For example, the tape emulation device 206 may be used for data backup of storage systems (e.g., the storage system 24, described above). Each backup may be subject to a retention policy where the backup data is no longer valid after a certain amount of time. It would be desirable to reclaim any storage space in the tape emulation unit 206 corresponding to expired data. However, each entire tape image may correspond to a single file on the storage system 235 of the tape emulation unit 206. If there is at least some non-expired data on the tape image, then the corresponding file may not be deleted.

Figure 11:
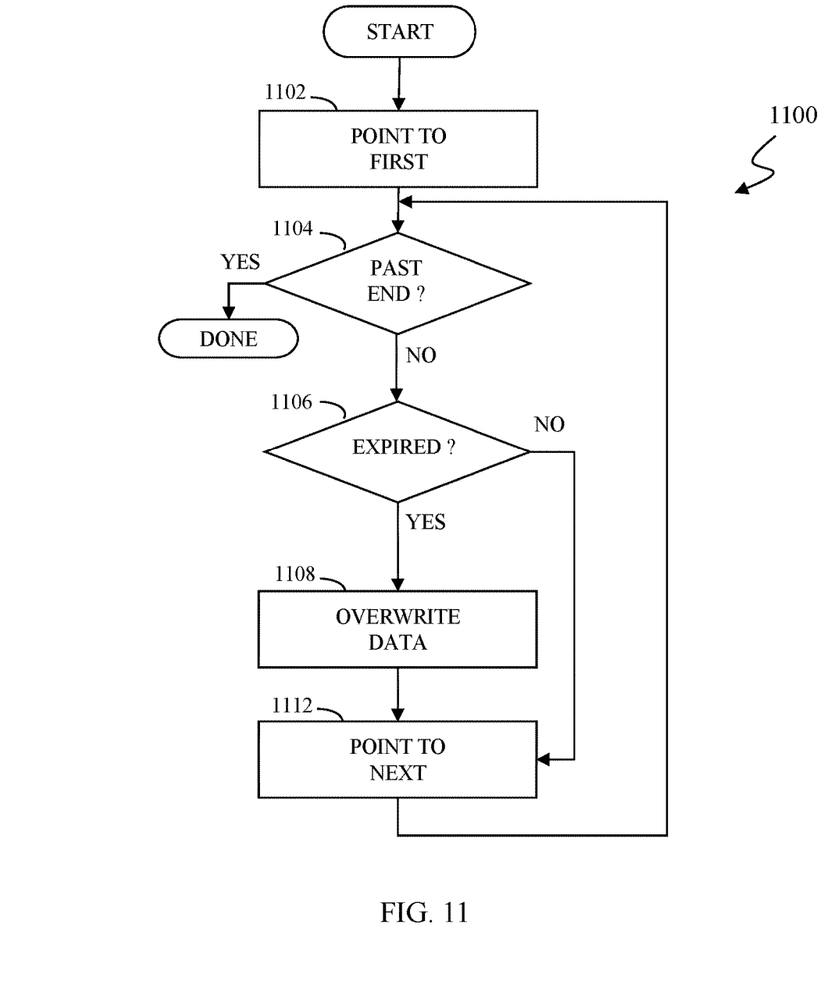
FIG. 11 is a flow diagram illustrating space reclamation for a tape emulation unit according to an embodiment of the system described herein.

Referring to FIG. 11, a flow diagram 1100 illustrates processing performed in connection with reducing an amount of storage space used for tape data. Processing begins at a first step 1102 where an iteration pointer, that iterates through all of the separate portions of a tape image, is initialized to point to a first portion. Following the step 1102 is a test step 1104 where it is determined if the iteration pointer points past the end of the tape image (i.e., all portions of the tape have been examined/processed). If so, then processing is compete. Otherwise, control transfers from the test step 1104 to a test step 1106 where it is determined if a current portion indicated by the iteration pointer has expired. In an embodiment herein, the processing illustrated by the flow diagram 1100 is provided by a host computer (e.g., the host 22, described above) that has information about the expiration of different portions of the tape data. The host computer may be running tape management software that keeps track of expiration dates. In other embodiments, expiration information may be provided by a header block that is part of the tape image, in which case the processing illustrated by the flow diagram 1100 may be provided by a host computer or directly by the tape emulation unit 206 without using a host computer. In instances where expiration information is provided by the header block that is part of the tape image, it is possible for the host (or another processing device) to have previously updated (written) the header block according to a tape data retention policy prior to performing the processing illustrated by the flow diagram 1100.

If it is determined at the test step 1106 that a current portion pointed to by the iteration pointer has expired, then control transfers from the test step 1106 to a step 1108 where all of the data for the current portion of the tape image is overwritten with zeros using, for example, the mechanism disclosed herein for modifying tape data. In an embodiment herein, the storage system 235 of the tape emulation unit 206 may deduplicate data stored thereon so that, for example, a series of data blocks containing all zeros can be compressed into a single block. Any appropriate mechanism may be used to deduplicate and/or compress the data, including well-known mechanisms for deduplicating and/or compressing data. In some embodiments, components of the entire tape emulation unit 206, including the front end component 232 and the data mover/server 234, cooperate to provide data deduplication/compression. Overwriting the portion with zeros at the step 1108 causes the system to reclaim the space for the portion through compression and/or deduplication. That is, when the entire portion is set to all zeros, mechanisms for compression and/or deduplication that are part of the tape emulation unit 206 will automatically reclaim space that had been used by the portion. Following the step 1108 is a step 1112 where the iteration pointer is incremented. Note that the step 1112 is also reached directly from the step 1106 if the portion has not expired. Following the step 1112, control transfers back to the step 1104, discussed above, for another iteration.

Various embodiments discussed herein may be combined with each other in appropriate combinations in connection with the system described herein. Additionally, in some instances, the order of steps in the flow diagrams, flowcharts and/or described flow processing may be modified, where appropriate. Furthermore, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of reclaiming storage space in a tape emulation unit, comprising:
   determining portions of a tape image of the tape emulation unit that correspond to data/files that have expired;
   for each of the portions that have expired, overwriting each of the portions with a same value; and
   the tape emulation unit performing at least one of: compression or deduplication on each of the portions to reclaim storage space maintained by each of the portions.

2. A method, according to claim 1, wherein the same value is zeros.

3. A method, according to claim 1, wherein expiration information is provided by header information on the tape image.

4. A method, according to claim 3, wherein the expiration information is written by a host computer coupled to the tape emulation unit.

5. A method, according to claim 4, wherein the host computer determines portions that have expired based on the header information.

6. A method, according to claim 5, wherein the host computer runs tape management software.

7. A method, according to claim 4, wherein the tape emulation unit determines portions that have expired based on the header information.

8. A method, according to claim 1, wherein the tape emulation unit includes a storage system that performs the compression or deduplication.

9. A non-transitory computer readable medium containing software that reclaims storage space in a tape emulation unit, the software comprising:
   executable code that determines portions of a tape image of the tape emulation unit that correspond to data/files that have expired;
   executable code that overwrites each of the portions that have expired with a same value; and
   executable code that performs at least one of: compression or deduplication on each of the portions to reclaim storage space maintained by each of the portions.

10. A non-transitory computer readable medium, according to claim 9, wherein the same value is zeros.

11. A non-transitory computer readable medium, according to claim 9, wherein expiration information is provided by header information on the tape image.

12. A non-transitory computer readable medium, according to claim 11, wherein the expiration information is written by a host computer coupled to the tape emulation unit.

13. A non-transitory computer readable medium, according to claim 12, wherein the host computer determines portions that have expired based on the header information.

14. A method, according to claim 13, wherein the host computer runs tape management software.

15. A non-transitory computer readable medium, according to claim 12, wherein the tape emulation unit determines portions that have expired based on the header information.

16. A method, according to claim 9, wherein the tape emulation unit includes a storage system that performs the compression or deduplication.

* * * * *